United States Patent [19]
Maeda et al.

[11] Patent Number: 5,412,395
[45] Date of Patent: May 2, 1995

[54] METHOD FOR DRIVING DISPLAY DEVICE

[75] Inventors: Hiroshi Maeda, Yamatokooriyama; Takuro Omori, Ikoma, both of Japan

[73] Assignee: Sharp Kabushiki Kaisha, Osaka, Japan

[21] Appl. No.: 892,736

[22] Filed: Jun. 1, 1992

Related U.S. Application Data

[63] Continuation of Ser. No. 530,804, May 30, 1990, abandoned.

[30] Foreign Application Priority Data

May 30, 1989 [JP] Japan ............................. 1-138807

[51] Int. Cl.⁶ ............................................. G09G 3/36
[52] U.S. Cl. .................................... 345/89; 345/149
[58] Field of Search .................. 340/793, 784, 805; 358/456, 457; 345/89, 147, 63, 149

[56] References Cited

U.S. PATENT DOCUMENTS

| | | | |
|---|---|---|---|
| 3,821,721 | 6/1974 | Hughes | 340/743 |
| 3,997,719 | 12/1976 | Judice | 340/793 |
| 4,531,160 | 7/1985 | Bhu | 340/793 |
| 4,827,255 | 5/1989 | Ishii | 345/89 |
| 5,266,940 | 11/1993 | Shiraishi | 345/149 |

FOREIGN PATENT DOCUMENTS

| | | |
|---|---|---|
| 193728A3 | 9/1986 | European Pat. Off. . |
| 306011A2 | 3/1989 | European Pat. Off. . |
| 3906924A1 | 9/1989 | Germany . |
| 1-225997 | 9/1989 | Japan . |

Primary Examiner—Ulysses Weldon
Assistant Examiner—Regina Liang

[57] ABSTRACT

A frame thinning out system has been used as a display driving method for making a gradational display with several brightness levels on the screen of a liquid crystal display device and the like. This display driving method creates a gradational display by setting a plurality of frame time periods, during which each of a plurality of pixels on the screen of the display device is controlled for displaying an image, as one integration time period. The pixels are turned on for only a number of specified frame time periods corresponding to a brightness level to be displayed. All pixels of the display device are grouped into multiple groups composed of a plurality of pixels contiguous to each other. The number of pixels to be turned on in each frame time period is selected corresponding to the specified gradation data within the same group. Thus, the number of pixels to be turned on for one frame time period may be equal between subgroups in the scanning lines within the same group. The frame time period during which the number of pixels turned on is kept constant is set such that a human being does not sense flicker. Thus, a gradational display without noticeable flicker can be obtained. Since no delicate shades of brightness occur among pixels to the same gradation level, quality of the display is improved.

22 Claims, 10 Drawing Sheets

Fig.12
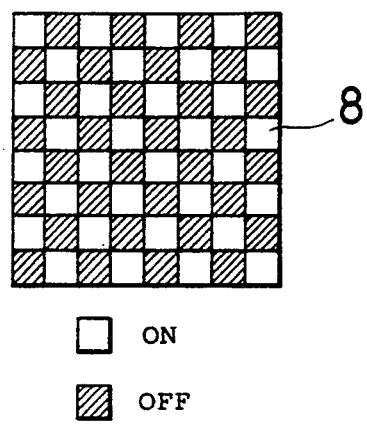
☐ ON
▨ OFF
Fig.13
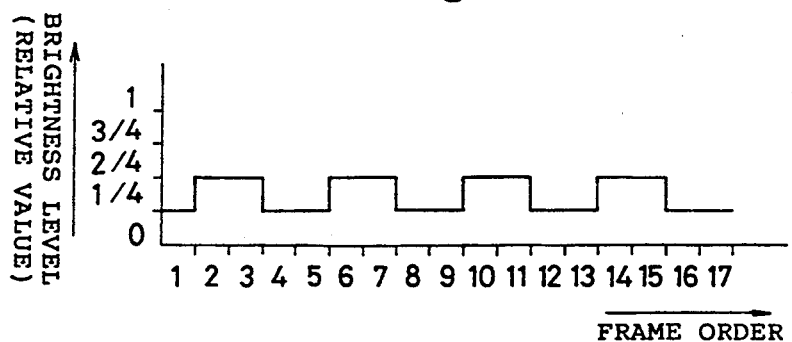
☐ ON
▨ OFF
Fig.14

METHOD FOR DRIVING DISPLAY DEVICE

This application is a continuation of application Ser. No. 07/530,804 filed on May 30, 1990, now abandoned.

BACKGROUND OF THE INVENTION

1. Field of the Invention

The present invention relates to a method for driving such display devices as a liquid crystal display device, thin film EL display device, and the like.

2. Description of the Prior Art

For a liquid crystal display device and the like, a frame thinning out system is well-known as a driving method for enabling such a display panel to display a gradationally toned image, with several brightness levels, on its screen.

The frame thinning out system turns on pixels only in a number of frames corresponding to a level of brightness to be displayed out of all frames within an integration time period consisting of a plurality of frame time periods, so as to visually obtain a medium level of brightness in each integration time period.

The applicant of the invention has already proposed a driving method to reduce flicker on the screen by grouping all pixels of the display device into groups, each of which is composed of a plurality of pixels contiguous to each other and limiting the total number of pixels to be turned on for each frame time period within the same group according to its display data as a display driving method, improving the conventional frame thinning out system.

Table 1 shows gradation rules (rules of turning pixels on or off for which frame time period) in case of making a gradational display by setting eight frame time periods as one integration time period by means of this driving method. In this case, all pixels on the screen are grouped into groups, each of which is composed of four pixels contiguous to each other as shown by arrow II, on the display panel composed of a plurality of pixels arranged in the form of matrix on it as shown schematically in the plan view of FIG. 1.

In Table 1, numeral 1 indicates turning a pixel on and numeral 0 indicates turning a pixel off.

FIG. 2 is a plan view schematically showing a magnification of one group of pixels shown by arrow II in the display panel. In the grouping, when setting the pixel in the upper left hand corner of the screen of the display panel 1 as a pixel in the 0th row and 0th column, the pixel arrangement is set so that in FIG. 2 the two upper pixels A and B are in an even-numbered row, the two lower pixels C

TABLE 1

| Gradation level | Pixel | Frame 1 | 2 | 3 | 4 | 5 | 6 | 7 | 8 |
|---|---|---|---|---|---|---|---|---|---|
| 0/8 | A | 0 | 0 | 0 | 0 | 0 | 0 | 0 | 0 |
|  | B | 0 | 0 | 0 | 0 | 0 | 0 | 0 | 0 |
|  | C | 0 | 0 | 0 | 0 | 0 | 0 | 0 | 0 |
|  | D | 0 | 0 | 0 | 0 | 0 | 0 | 0 | 0 |
| 1/8 | A | 1 | 0 | 0 | 0 | 0 | 0 | 0 | 0 |
|  | B | 0 | 0 | 1 | 0 | 0 | 0 | 0 | 0 |
|  | C | 0 | 0 | 0 | 0 | 1 | 0 | 0 | 0 |
|  | D | 0 | 0 | 0 | 0 | 0 | 0 | 1 | 0 |
| 2/8 | A | 1 | 0 | 0 | 0 | 1 | 0 | 0 | 0 |
|  | B | 0 | 1 | 0 | 0 | 0 | 1 | 0 | 0 |
|  | C | 0 | 0 | 1 | 0 | 0 | 0 | 1 | 0 |
|  | D | 0 | 0 | 0 | 1 | 0 | 0 | 0 | 1 |
| 3/8 | A | 1 | 0 | 0 | 1 | 0 | 0 | 1 | 0 |
|  | B | 0 | 1 | 0 | 0 | 1 | 0 | 0 | 1 |

TABLE 1-continued

| Gradation level | Pixel | Frame 1 | 2 | 3 | 4 | 5 | 6 | 7 | 8 |
|---|---|---|---|---|---|---|---|---|---|
|  | C | 0 | 1 | 1 | 0 | 0 | 1 | 0 | 0 |
|  | D | 0 | 0 | 0 | 1 | 1 | 0 | 0 | 1 |
| 4/8 | A | 1 | 0 | 1 | 0 | 1 | 0 | 1 | 0 |
|  | B | 0 | 1 | 0 | 1 | 0 | 1 | 0 | 1 |
|  | C | 1 | 0 | 1 | 0 | 1 | 0 | 1 | 0 |
|  | D | 0 | 1 | 0 | 1 | 0 | 1 | 0 | 1 |
| 6/8 | A | 0 | 1 | 1 | 1 | 0 | 1 | 1 | 1 |
|  | B | 1 | 0 | 1 | 1 | 1 | 0 | 1 | 1 |
|  | C | 1 | 1 | 0 | 1 | 1 | 1 | 0 | 1 |
|  | D | 1 | 1 | 1 | 0 | 1 | 1 | 1 | 0 |
| 7/8 | A | 0 | 1 | 1 | 1 | 1 | 1 | 1 | 1 |
|  | B | 1 | 1 | 0 | 1 | 1 | 1 | 1 | 1 |
|  | C | 1 | 1 | 1 | 1 | 0 | 1 | 1 | 1 |
|  | D | 1 | 1 | 1 | 1 | 1 | 1 | 0 | 1 |
| 8/8 | A | 1 | 1 | 1 | 1 | 1 | 1 | 1 | 1 |
|  | B | 1 | 1 | 1 | 1 | 1 | 1 | 1 | 1 |
|  | C | 1 | 1 | 1 | 1 | 1 | 1 | 1 | 1 |
|  | D | 1 | 1 | 1 | 1 | 1 | 1 | 1 | 1 | and D are in an odd-numbered row, the two left pixels A and C are in an even-numbered column, and the two right pixels B and D are in an odd-numbered column.

FIG. 3 is a schematic diagram showing a gradation rule of each of pixels A to D within one group in case of displaying the 6/8 gradation level all over the screen of the display panel 1 according to the gradation rule.

As known from FIG. 3, in the case of displaying the 6/8 gradation level, three pixels B, C and D are turned on (the pixels A is turned off) for the first frame time period, three pixels A, C and D are turned on (the pixel B is off) for the second frame time period, three pixels A, B and D are turned on (the pixel C is off) for the third frame time period, and three pixels A, B and C are turned on for the fourth frame time period. The rules for the first to fourth frame time periods are also applied to the fifth to eighth frame time periods, respectively, and after this, the cycle is repeated for eight frame time periods as an integration time period. Namely, in the case of displaying the 6/8 gradation level, three pixels are always turned on for each frame time period and each of pixels A to D are turned on, equally, six times for eight frame time periods.

In this case brightness level as a whole of a unit image area of one group composed of pixels A to D is as shown in FIG. 4.

Namely, since three pixels are turned on throughout all frame time periods, the brightness level is always ¾. Accordingly, the 6/8 brightness level is displayed, on the average, during one integration time period consisting of eight frame time periods. Further, brightness level of the group does not vary as a whole of the unit image area, so flicker is reduced.

In the above-mentioned driving method previously proposed, however, as shown in FIG. 3, in case of the 6/8 brightness level, the number of pixels turned on in a subgroup of pixels A and B in the upper even-numbered row out of the pixels A to D within one group for each frame time period is different from the number of pixels turned on in a subgroup of pixels C and D in the lower odd-numbered row. As a result, there has been a problem that quality of the display is deteriorated depending on a viewing angle in the case where the above-mentioned driving method is applied to such a capacitive display device as a liquid crystal display device.

Namely, since such a capacitive display device as a liquid crystal display device shows a phenomenon that brightness of the pixel turned on at that time varies according to the number of pixels turned on out of the pixels arranged in one row (common line) on the screen of the display panel 1. Namely the difference between the number of pixels turned on in a subgroup of pixels A and B in the upper even-numbered row out of the pixels A to D within one group and the number of pixels turned on in a subgroup of pixels C and D in the lower odd-numbered row causes such deterioration of quality of the display that brightness of the pixels vary for each frame time period, and the bright points appear to be vibrating.

This problem also occurs in the case of displaying the other gradation levels.

SUMMARY OF THE INVENTION

An object of the present invention is to provide a display driving method which makes it possible to display a high quality image with no noticeable flicker and no delicate shades of brightness among pixels of the same gradation level, even in a case where the capacitive display device is a liquid crystal display device.

The invention provides a display driving method for driving a display device having a plurality of scanning lines which makes a gradationally toned display with several brightness levels by setting a plurality of frame time periods. During the frame time periods, each of the pixels on its screen is controlled for displaying an image, as one integration time period. Further, by turning on pixels for a number of specified frame time periods corresponding to display data of the image within the integration time period, the display driving method makes a gradationally toned display by, grouping all pixels of the display device into groups, each group composed of a plurality of pixels contiguous to each other, selecting the number of pixels to be turned on for each of the frame time periods within one integration time period corresponding to the specified gradation data of each group, so that the number of pixels to be turned on for one frame time period may be equal between subgroups in the scanning lines within the same group, and setting the frame time period, while the number of pixels to be turned on is kept constant, to a period shorter than a predetermined period.

Further, the invention provides a display driving method which makes a gradationally toned display by using multiple gradation data for each frame time period on the basis of a plurality of gradation data which are spaced apart by nearly an equal level from the specified gradation data in directions opposite to each other.

Further, the invention provides a display device driving method which makes a gradationally toned display by turning on a number of pixels corresponding to the specified gradation data for each frame time period.

Still further, the invention provides a display driving method in which each of the pixels to be turned on is selected from pixels in different positional locations within the group for each frame time period.

And furthermore, the invention provides a display driving method in which the difference between the plural gradation data is selected so as to be a minimum unit of gradation data.

Still furthermore, the invention provides a display driving method in which a period of variation among the plural gradation data is selected so as to be the same period as the frame time period.

According to the invention, all pixels of a display device are grouped into plural groups, each of which is composed of plural pixels contiguous to each other. The number of pixels to be turned on for each frame time period within one integration time period is selected corresponding to the specified gradation data. Thus, the number of pixels to be turned on for one frame time period may be equal between subgroups in the scanning lines within the same group. Further, the frame time period during which the number of pixels to be turned on is kept constant is selected so as to be shorter than a predetermined period, namely, the minimum period for which a human being feels flicker.

Accordingly, in case of viewing a plurality of pixels all over one group as a unit image area, a high quality gradational display without noticeable flicker can be obtained. Further since no delicate shades of brightness occur among pixels to display the same gradation level, quality of the display is improved.

As mentioned above, according to a display device driving method by the invention, selecting the number of pixels to be turned on, out of plural pixels contiguous to each other to form one group for each frame time period corresponding to its display data, reduces variation of brightness as a whole of one group of plural pixels. Further, it makes it possible to obtain a gradationally toned display without noticeable flicker.

Since the number of pixels to be turned on for each frame time period is equal to each other among the subgroups respectively arranged in the scanning line within the same group, no delicate shades of brightens occur among pixels to display the same gradation level. This is true even in the case of applying this driving method to such a capacitive display device as a liquid crystal display device. Further, as a result, quality of the display is much improved.

BRIEF DESCRIPTION OF THE DRAWINGS

These objects, the other objects, features, and merits of the present invention will be clarified more expressly by the following detailed descriptions and drawings.

FIG. 8 is a schematic diagram showing gradation rules applied to the liquid crystal display device driving method, FIG. 10 is a schematic diagram showing gradation rules in case of display a checker pattern on the basis of the above-mentioned gradation rules, FIG. 12 is a plan view schematically showing a display screen of the checker pattern, FIG. 13 is a schematic diagram showing a gradation rule for the 6/8 gradation level in case of displaying a checker pattern on the basis of the gradation rule in the driving method previously proposed as an example, and FIG. 14 is a schematic diagram showing variation of brightness in one group of pixels controlled on the basis of this gradation rule.

DETAILED DESCRIPTION OF THE PREFERRED EMBODIMENT

Figure 1:
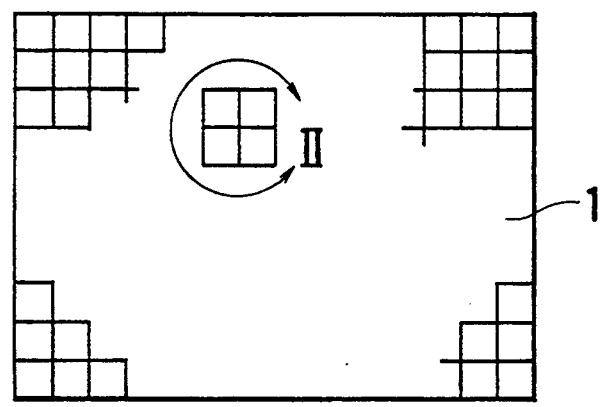
FIG. 1 is a plan view of the display panel schematically shown to explain grouping of the pixels in a driving method previously proposed as an example.
Figure 2:
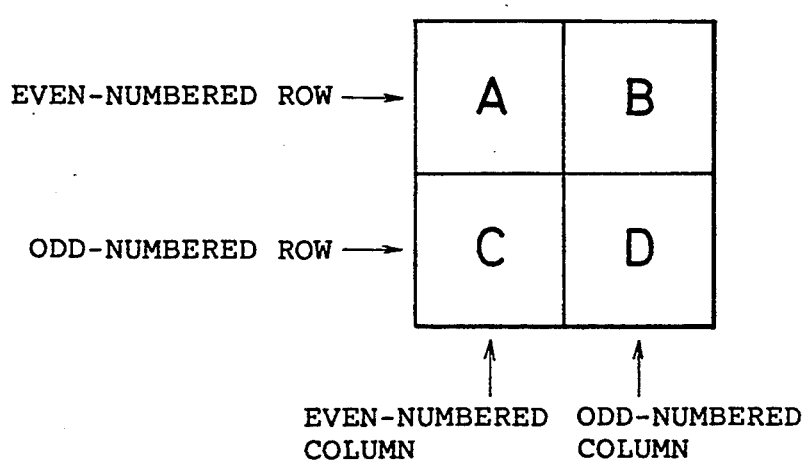
FIG. 2 is a plan view schematically showing a magnification of one group of pixels of the display panel.

Referring to the drawings, a preferred embodiment of the present invention is described in detail below.

Figure 5:
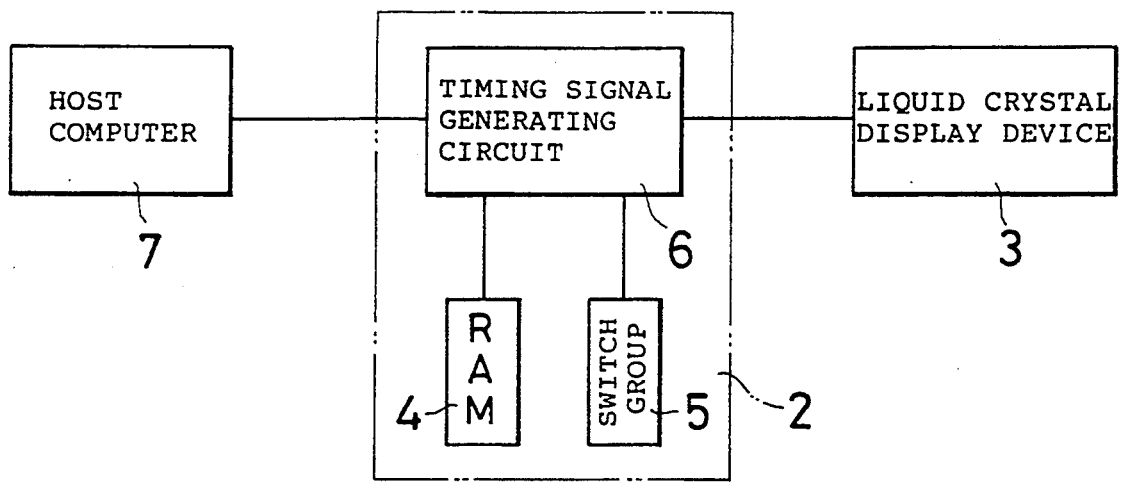
FIG. 5 is a block diagram to show roughly configuration of a liquid crystal display device driving method to which a driving method of an embodiment of the invention is applied.

FIG. 5 is a block diagram roughly showing a liquid crystal display device driving method to which a driving method of an embodiment of the invention is applied.

In FIG. 5, a controller 2, which is a circuit to control driving of a liquid crystal display device 3, consists of a random access memory 4 (hereinafter referred as to RAM) which stores display data including their gradation data, a switch group 5 which sets gradation rules of a frame thinning out system, and a timing signal generating circuit 6 which generates timing signals necessary for making the liquid crystal display device 3 display an image. A host computer 7 is in charge of controlling the timing signal generating circuit 6.

Figure 6:
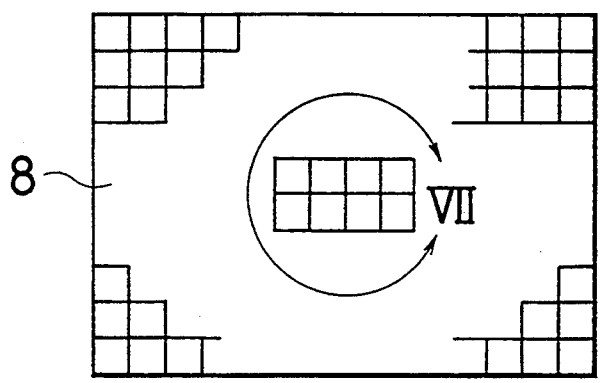
FIG. 6 is a plan view schematically showing the display panel of the liquid crystal display device.
Figure 7:
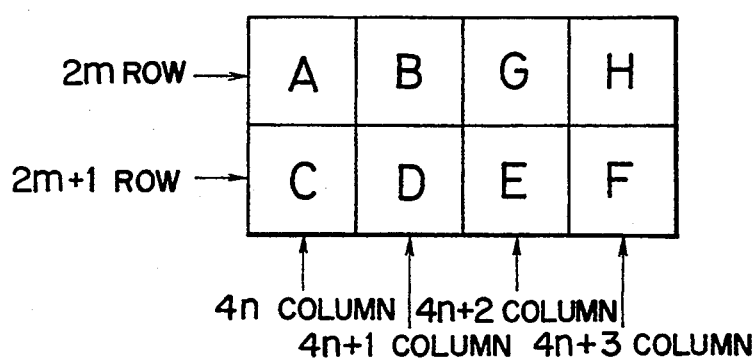
FIG. 7 is a plan view schematically showing a magnification of one group of pixels of the display panel.

FIG. 6 is a plan view schematically showing a display panel 8 of the liquid crystal display device 3 in which a plurality of pixels are arranged in the form of matrix; and FIG. 7 is a plan view schematically showing a magnification of one group of pixels shown by arrow VII of FIG. 6 in the display panel 8.

Figure 8:
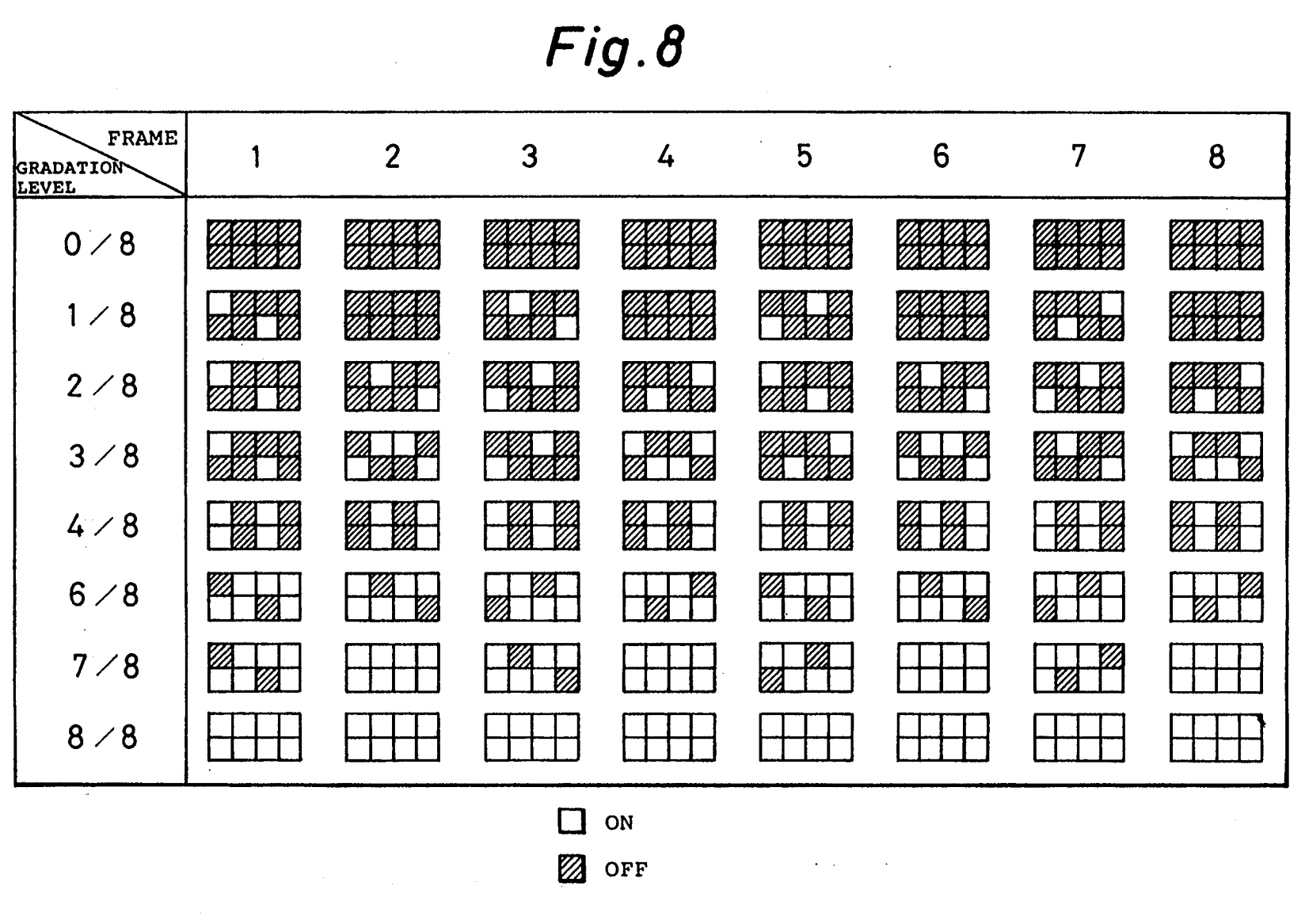

FIG. 8 is a schematic diagram showing gradation rules applied to the liquid crystal display device driving method in case of displaying a uniform gradation throughout the screen (a display in a uniform gradation all over the screen of the display panel 8). FIG. 9a–h are a set of schematic diagrams showing variation of brightness in a gradational display controlled by the method. Referring to FIG. 8 and 9a–h, operation of the liquid crystal display device driving method is described as follows.

Assuming that a gradationally toned display with 9 levels of the 0/8 (0 level), ⅛, 2/8, ⅜, 4/8, ⅝, 6/8, ⅞, and 8/8 (1 level) gradation levels is performed by setting eight frame time periods as one integration time period. A case is described where a unit image area with the 0/8, ⅛, 2/8, ⅜, 4/8, ⅝, 6/8, ⅞, or 8/8 gradation level in brightness is displayed with a group of pixels A, B, C, D, E, F, G and H shown in FIG. 7.

When setting the pixel in the upper left hand corner of the screen of the display panel 8 shown in FIG. 6 as a pixel in the 0th row and 0th column, all pixels on the display panel 8 are grouped into a plurality of groups, each of which is composed of the pixels shown in FIG. 7. Thus, of pixels shown in FIG. 7 the upper pixels A, B, G, and H may be in the (2m)th row on the screen, the lower pixels C, D, E, and F may be in the (2m+1)th row on the screen, the pixels A and C in the leftmost column may be in the (4n)th column, the pixels B and D in the 2nd column from the left may be in the (4n+1)th column on the screen, the pixels G and E in the 3rd column from the left may be in the (4n+2)th column on the screen, and the pixels H and F in the rightmost column may be in the (4n+3)th column on the screen (where m and n are respectively integers which are equal to or greater than 0 and independent from each other).

In the switch group 5 shown in FIG. 5, the gradation rules shown in FIG. 8 are applied to the pixels A to H. Namely, in this case the gradation rules applied to the pixels A to D are exactly the same as the gradation rules applied to the pixels A to D in case of the proposed example shown in Table 1. When setting the driving data of turning on or off the pixels A, B, C, D, E, F, G, and H respectively as a, b, c, d, e, f, g, and h, the gradation rules shown in FIG. 8 sets a=e, b=f, c=g, and d=h. Namely, for the pixels in FIG. 7, the on/off state of the lower pixels E and F is set to the same state as the on/off state of the upper pixels A and B in each frame, and the on/off state of the upper pixels G and H is set to the same as the on/off state of the lower pixels C and D.

In case of displaying the 0/8 gradation level, concretely, the off (no lighting) state is always selected for all of the eight pixels A to H throughout all of the eight frame time periods. After this this the same cycle is repeated.

In case of displaying the ⅛ gradation level, the on (lighting) state is selected for the two pixels A and E in the first frame out of the eight frames, the off state is selected for all of the eight pixels A to H in the second frame, the on state is selected for the two pixels B and F in the third frame, the off state is selected again for all of the eight pixels A to H in the fourth frame, the on state is selected for the two pixels C and G in the 5th frame, the off state is selected again for all of the eight pixels A to H in the 6th frame, the on state is selected for the two pixels D and H in the 7th frame, and the off state is selected for all of the eight pixels A to H in the 8th frame; and after this the same cycle is repeated. Namely, in displaying the ⅛ gradation level, a frame in which two pixels are turned on and another frame in which all of the eight pixels are turned off are alternately displayed. In this case, each of the pixels A to H is turned on equally once (in one frame) during the eight frame time periods.

In case of displaying the 2/8 gradation level, the on state is selected for the pixels A and E in the first frame, for the pixels B and F in the second frame, for the pixels C and G in the third frame, for the pixels D and H in the 4th frame, and the pixel control rules in the first to fourth frames are repeated in the 5th to 8th frames; and after this the same cycle is repeated. Namely, in displaying the 2/8 gradation level, two pixels are turned on in all frames and each of the pixels A to H is turned on equally, namely twice during the eight frame time periods.

In case of displaying the ⅜ gradation level, the on state is selected for the pixels A and E in the first frame, for the pixels B, C, F, and G in the second frame, for the pixels C and G in the third frame, for the pixels A, D, E, and H in the 4th frame, for the pixels D and H in the 5th frame, for the pixels B, C, F, and G in the 6th frame, for the pixels B and F in the 7th frame, and for the pixels A, D, E, and H in the 8th frame; and after this the same cycle is repeated. Namely, in displaying the ⅜ gradation level, a frame in which two pixels are turned on and another frame in which four pixels are turned on are alternately displayed, and each of the pixels A to H is turned on equally three times during the eight frame time periods.

In case of displaying the 4/8 gradation level, the on state is selected for the pixels A, C, E, and G in the first frame and for the pixels B, D, F, and H in the second frame and the gradation rules in the first and second frames are repeatedly applied to the 3rd to 8th frames; and after this the same cycle is repeated. Namely, in displaying the 4/8 gradation level, four pixels are turned on in all of the eight frames and each of the pixels A to H is turned on equally 4 times during the 8 frames.

In case of displaying the 6/8 gradation level, the on state is selected for the pixels B, C, D, F, G, and H in the first frame, for the pixels A, C, D, E, G, and H in the second frame, for the pixels A, B, D, E, F, and H in the third frame, for the pixels A, B, C, E, F, and G in the 4th frame, and the gradation rules in the first to fourth frames are repeatedly applied to the 5th to 8th frames; and after this the same cycle is repeated. Namely, in displaying the 6/8 gradation level, six pixels are turned on in all the frames and each of the pixels A to H is turned on equally 6 times during the eight frame time periods.

In case of displaying the $\frac{7}{8}$ gradation level, the on state is selected for the pixels B, C, D, F, G, and H in the first frame, for all of the pixels A to H in the second frame, for the pixels A, C, D, E, G, and H in the third frame, for all of the pixels A to H in the fourth frame, for the pixels A, B, D, E, F, and H in the 5th frame, for all of the pixels A to H in the 6th frame, for the pixels A, B, C, E, F, and G in the 7th frame, and for all of the pixels A to H in the 8th frame; and after this the same cycle is repeated. Namely, in displaying the $\frac{7}{8}$ gradation level, a frame in which six pixels are turned on and another frame in which eight pixels are turned on are alternately displayed and each of the pixels A to H is turned on equally 7 times during the eight frame time periods.

In case of displaying the 8/8 gradation level, the on state is always selected for all of the eight pixels A to H during the eight frame time periods, and after this the same cycle is repeated.

According to these gradation rules, the controller 2 drives the eight pixels A to H forming one group in the display panel 8 of the liquid crystal display device 3. In these cases, brightness levels as a whole of one group composed of the 8 pixels A to H in the display panel 8 are as shown in FIGS. 9(a), (b), (c), (d), (e), (f), (g), and (h).

Figure 9:
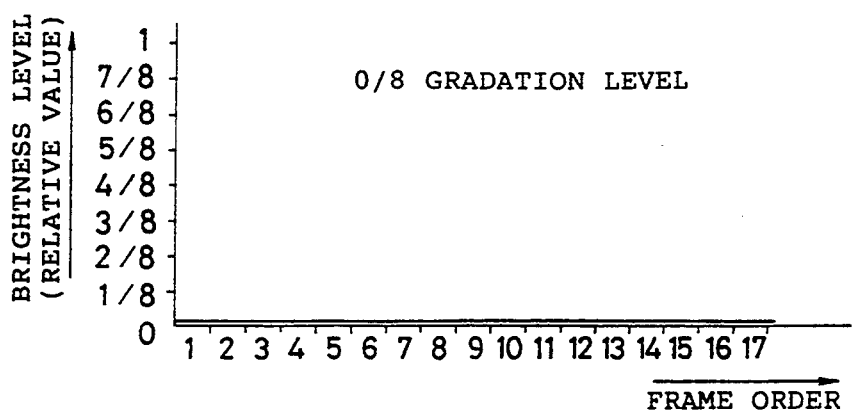
FIGS. 9a–h are a set of schematic diagrams showing variation of brightness in one group of pixels controlled on the basis of the gradation rules.
Figure 9:
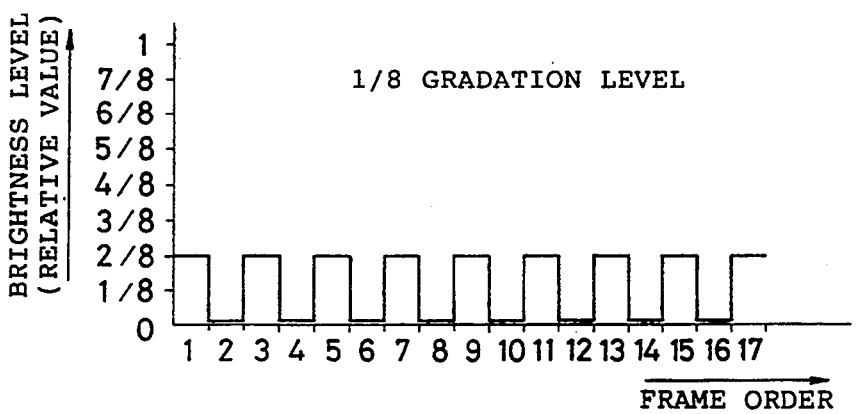
Figure 9:
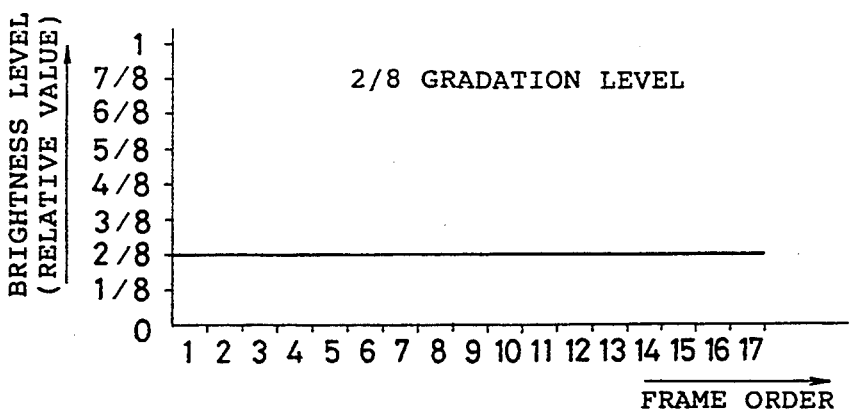
Figure 9:
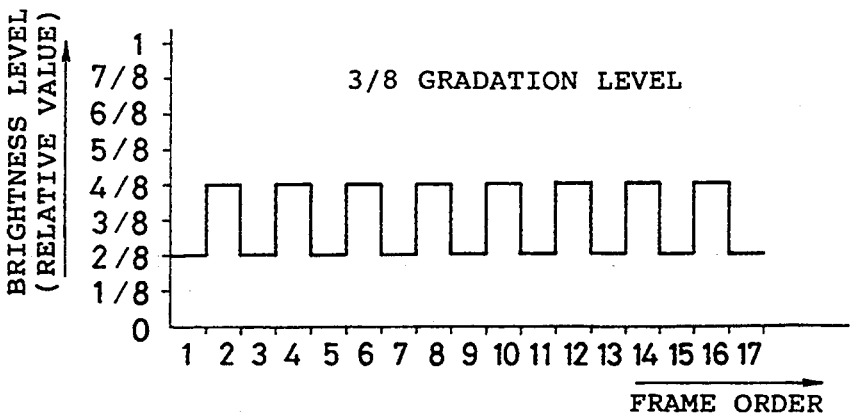
Figure 9:
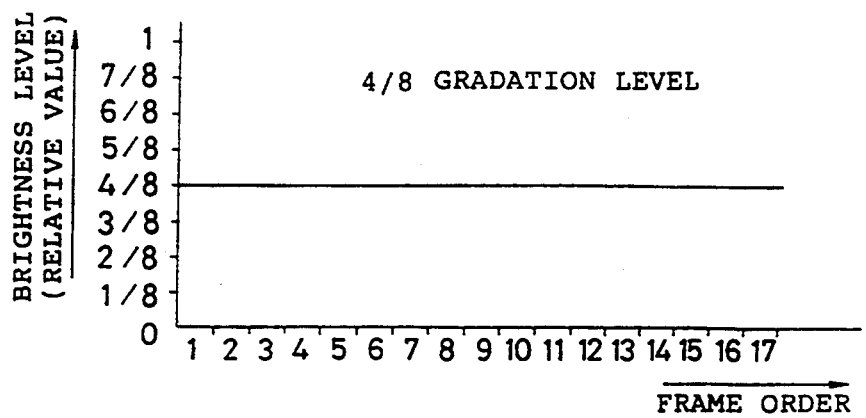
Figure 9:
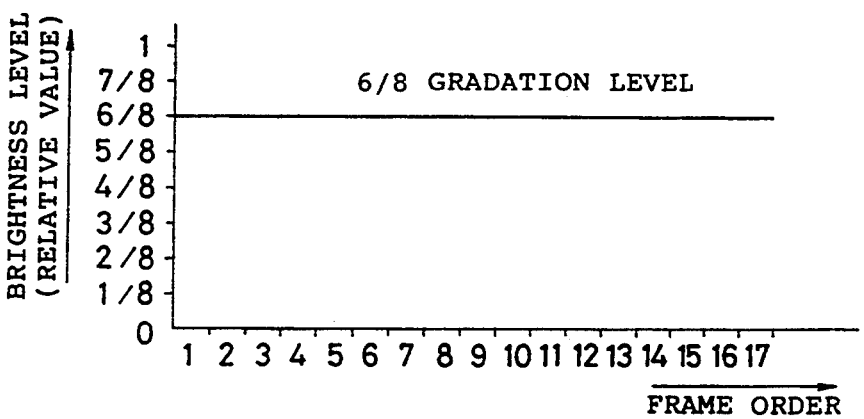
Figure 9:
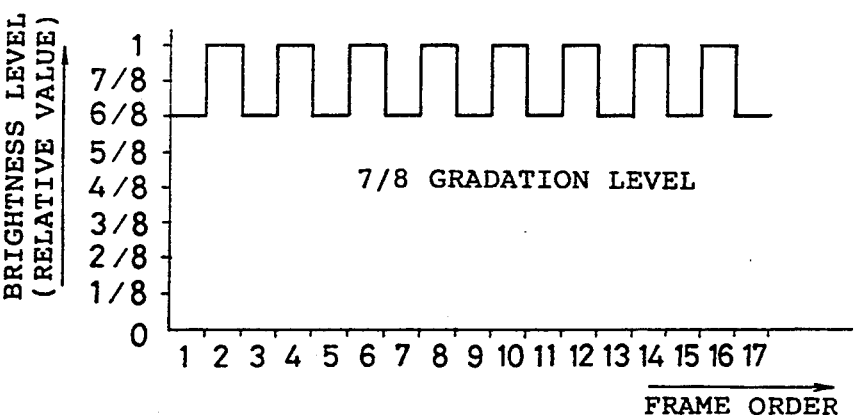
Figure 9:
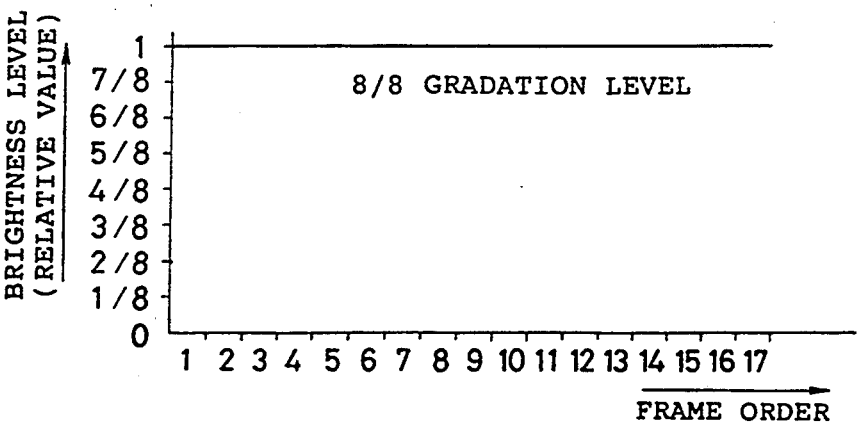

That is to say, in the case of displaying the 0/8 gradation level, since all of the 8 pixels A to H are turned off throughout all frame time periods, the brightness level is always 0 as shown in FIG. 9(a). Accordingly, the average brightness level is also 0 during one integration time period consisting of 8 frame time periods. In this case, since the brightness level does not vary, no flicker occurs.

In the case of displaying the $\frac{1}{8}$ gradation level, as shown in FIG. 9(b), since two pixels are turned on in the first frame the brightness level is 2/8 and since all of the 8 pixels are turned off in the second frame the brightness level becomes 0, and this cycle is repeated. As a result, the $\frac{1}{8}$ brightness level is displayed on the average during one integration time period consisting of 8 frame time periods. Further, since a frequency of alternating the 2/8 and 0 brightness levels is a half of the frame frequency and (quadruple) greater than the frequency having 8 frame periods as one integration period, flicker is reduced much.

In the case of displaying the 2/8 gradation level, as shown in FIG. 9(c), since two pixels are always turned on throughout all frame time periods, the brightness level is always 2/8. Accordingly, the average brightness level is also 2/8 during one integration time period consisting of 8 frame time periods. In this case, since the brightness level does not vary, no flicker occurs.

In the case of displaying the $\frac{3}{8}$ gradation level, as shown in FIG. 9(d), since two pixels are turned on in the first frame the brightness level is 2/8 and since four pixels are turned on in the second frame the brightness level becomes 4/8, and this cycle is repeated. As a result, the $\frac{3}{8}$ brightness level is displayed on the average during one integration time period consisting of 8 frame time periods. Further, since a frequency of alternating the 2/8 and 4/8 brightness levels is a half of the frame frequency and (quadruple) greater than the frequency having 8 frame periods as one integration period, flicker is reduced so much.

In the case of displaying the 4/8 gradation level, as shown in FIG. 9(e), since four pixels are always turned on throughout all frame time periods, the brightness level is always 4/8. Accordingly, the average brightness level is also 4/8 during one integration time period consisting of 8 frame time periods. In this case also, since the brightness level does not vary, no flicker occurs.

In the case of displaying the 6/8 gradation level also, as shown in FIG. 9(f), since six pixels are always turned on throughout all frame time periods, the brightness level is always 6/8. In this case also, since the brightness level does not vary, no flicker occurs.

In the case of displaying the $\frac{7}{8}$ gradation level, as shown in FIG. 9(g), since six pixels are turned on in the first frame the brightness level is 6/8 and since all of the 8 pixels are turned on in the second frame the brightness level becomes 8/8, and this cycle is repeated. As a result, the $\frac{7}{8}$ brightness level is displayed on the average during one integration time period consisting of 8 frame time periods. Further, since a frequency of alternating the 6/8 and 8/8 brightness levels is a half of the frame frequency and greater than the frequency having 8 frame periods as one integration time period, flicker is reduced so much.

Finally, in the case of displaying the 8/8 gradation level, as shown in FIG. 9(h), since all of the 8 pixels are always turned on throughout all frame time periods, the brightness level is always 8/8. Accordingly the average brightness level is also 8/8 during one integration time period consisting of 8 frame time periods. In this case also, since the brightness level does not vary, no flicker occurs.

As mentioned above, since the on/off state of the pixels A and B in the upper row out of the pixels A to H of one group is the same as the on/off state of the pixels E and F in the lower row and the on/off state of the pixels C and D in the lower row is the same as the on/off state of the pixels G and H in the upper row, the number of pixels turned on out of the pixels A, B, G, and H in the upper row and the number of pixels turned on out of the pixels C, D, E, and F in the lower row within one group are always equal to each other. Accordingly, in the case where the same brightness level of display is displayed over the entire screen, the number of pixels turned on out of the pixels arranged in one scanning line in a frame is always the same as that in any other frame. As a result, brightness of pixels turned on does not happen to vary in each frame and any delicate shades of brightness do not occur among pixels.

Figure 10:
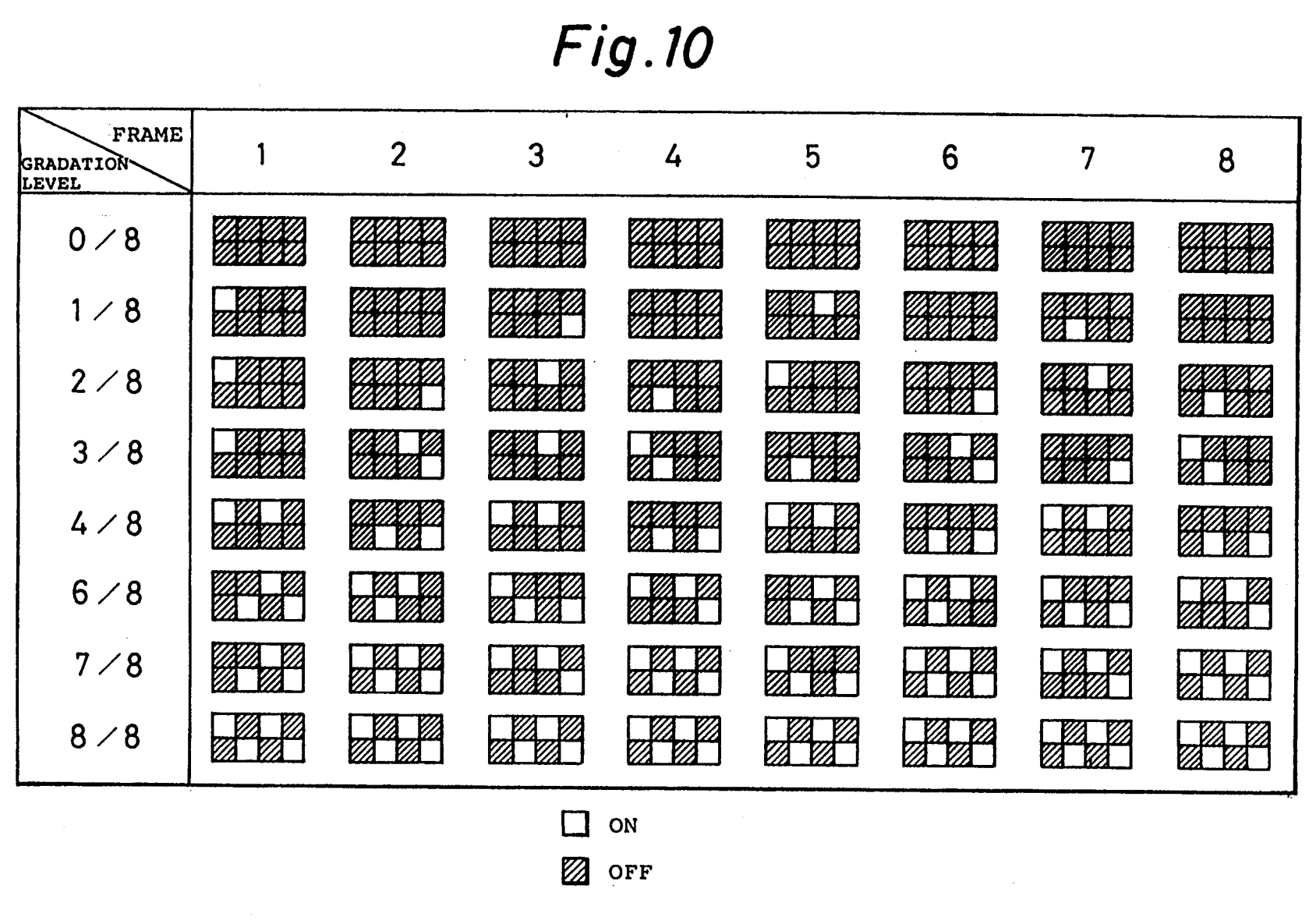

FIG. 10 is a schematic diagram showing gradation rules for displaying a checker pattern as shown in FIG. 12 on the basis of the gradation rules shown in FIG. 8; and FIG. 11 is a set of schematic diagrams showing variation of brightness level in a gradational display obtained by the gradation rules in FIG. 10.

In FIG. 12, a pixel to be turned on, out of pixels on the display panel 8, is indicated as a blank box, and a pixel to be turned off is indicated as a hatched box. The pixel in the upper left hand corner of the screen and pixels alternately disposed following it are turned on. Accordingly, the gradation rules shown in FIG. 10 are equivalent to those according to which the pixels B, C, E, and H out of the pixels A to H controlled according to the gradation rules shown in FIG. 8 are turned off throughout all frame time periods.

As mentioned above, since the gradation rules shown in FIG. 8 are set so that the on/off state of the pixels A and B out of one group of pixels shown in FIG. 7 may be equal to the on/off state of the pixels E and F and the on/off state of the pixels C and D may be equal to the on/off state of the pixels G and H, the pixels F and G to be set in the same on/off state as the pixels B and C are not changed to be turned off among the pixels E, F, G, and H in order to display a checker pattern, even in the case where the pixels B and C to be originally turned on are changed to be turned off in order to display a checker pattern among the pixels A, B, C, and D. Namely, it is the pixels E and H that are changed to be turned off among the pixels E, F, G, and H in order to display a checker pattern in spite of being originally turned on.

On the other hand, even in the case where, among the pixels E, F, G, and H, the pixels E and H are changed to be turned off in order to display a checker pattern in spite of being originally turned on, among the pixels A, B, C, and D the pixels A and D, to be set in the same on/off state as the pixels E and H are not changed to be turned off in order to display a checker pattern. Accordingly, the number of pixels turned on in each frame according to the gradation rules in case of displaying a checker pattern is reduced to one half as compared with that according to the gradation rules shown in FIG. 8. However, the corresponding relation between the number of pixels turned on and the gradation level is kept equal in both the cases.

Namely, in FIG. 10, in case of displaying the 0/8 gradation level, the on/off state of the pixels is the same as that in FIG. 8. However, in the case of displaying the ⅛ gradation level, the pixel A is turned on in the 1st frame, all the pixels are turned off in the 2nd frame, the pixel F is turned on in the 3rd frame, all the pixels are turned off in the 4th frame, the pixel G is turned on in the 5th frame, all the pixels are turned off in the 6th frame, the pixel D is turned on in the 7th frame, and all the pixels are turned off in the 8th frame. Namely, in displaying the ⅛ gradation level, a frame in which one pixel is turned on and another frame in which all of the 8 pixels A to H are turned off are alternately displayed.

In the case of displaying the 2/8 gradation level, the on state is selected for the pixel A in the 1st frame, for the pixel F in the 2nd frame, for the pixel G in the 3rd frame, for the pixel D in the 4th frame, and the same gradation rules as the 1st to 4th frames are applied to the 5th to 8th frames. Namely, in displaying the 2/8 gradation level, one pixel is turned on in all frames.

In the case of displaying the ⅜ gradation level, the on state is selected for the pixel A in the 1st frame, for the pixels F and G in the 2nd frame, for the pixel G in the 3rd frame, for the pixels A and D in the 4th frame, for the pixel D in the 5th frame, for the pixels F and G in the 6th frame, for the pixel F in the 7th frame, and for the pixels A and D in the 8th frame. Namely, in displaying the ⅜ gradation level, a frame in which one pixel is turned on and another frame in which two pixels are turned on are alternately displayed.

In the case of displaying the 4/8 gradation level, the on state is selected for the pixels A and G in the 1st frame, for the pixels D and F in the 2nd frame, and after this the same cycle is repeated. Namely, in displaying the 4/8 gradation level, two pixels are turned on in all frames.

In the case of displaying the 6/8 gradation level, the on state is selected for the pixels D, F, and G in the 1st frame, for the pixels A, D, and G in the 2nd frame, for the pixels A, D, and F in the 3rd frame, for the pixels A, F, and G in the 4th frame, and the same gradation rules as the 1st to 4th frames are applied to the 5th to 8th frames. Namely, in displaying the 6/8 gradation level, three pixels are turned on in all frames.

In the case of displaying the ⅞ gradation level, the on state is selected for the pixels D, F, and G in the 1st frame, for the pixels A, D, F, and G in the 2nd frame, for the pixels A, D, and G in the 3rd frame, for the pixels A, D, F, and G in the 4th frame, for the pixels A, D, and F in the 5th frame, for the pixels A, D, F, and G in the 6th frame, for the pixels A, F, and G in the 7th frame, and for the pixels A, D, F, and G in the 8th frame. Namely, in displaying the ⅞ gradation level, a frame in which three pixels are turned on and another frame in which four pixels are turned on are alternately displayed.

Finally, in the case of displaying the 8/8 gradation level, the on state is selected for the pixels A, D, F, and G in all frames. Namely, in displaying the 8/8 gradation level, four pixels are turned on in all frames.

Figure 11A:
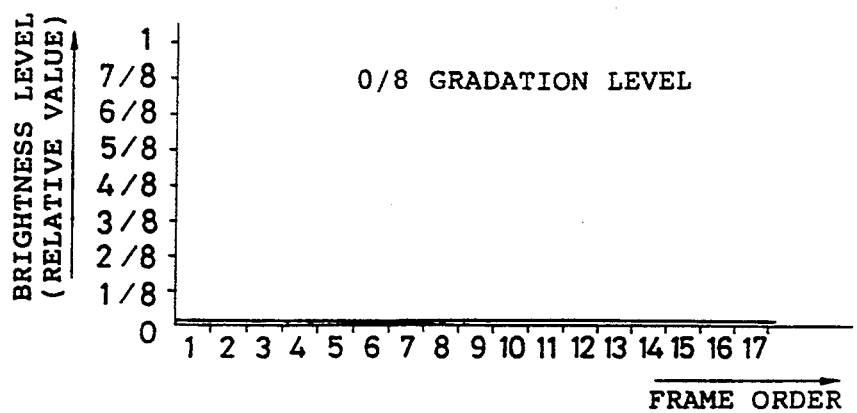
FIGS. 11a–h are a set of schematic diagrams showing variation of brightness in one group of pixels controlled on the basis of the gradation rules.

In these cases, brightness levels as a whole of one group composed of the 8 pixels A to H in the display panel 8 are as shown in FIG. 11(a), (b), (d), (c), (e), (f), (g), and (h).

That is to say, in the case of displaying the 0/8 gradation level, since all of the pixels A to H are turned off throughout all frame time periods, the brightness level is always 0 as shown in FIG. 11(a).

Figure 11B:
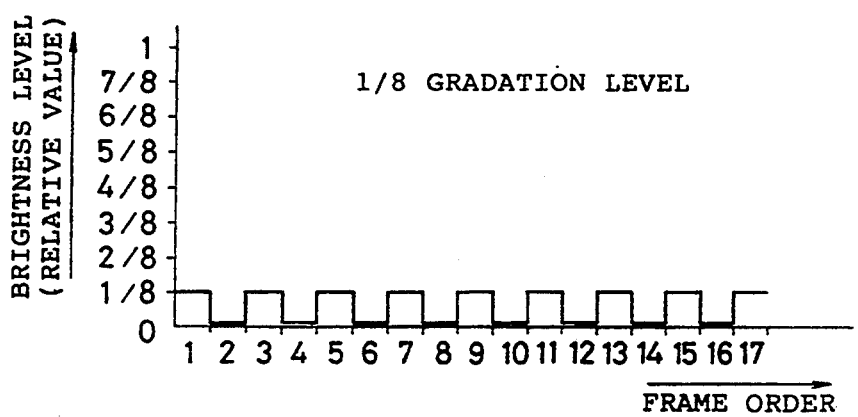

In the case of displaying the ⅛ gradation level, as shown in FIG. 11(b), since two pixels are turned on in the first frame the brightness level is 2/8 and since all of the 8 pixels are turned off in the 2nd frame the brightness level becomes 0, and this cycle is repeated. As a result, the 1/16 brightness level is displayed on the average during one integration time period consisting of 8 frame time periods. And since a frequency of alternating the ⅛ and 0 brightness levels is a half of the frame frequency and (quadruple) greater than the frequency having 8 frame periods as one integration period, flicker is reduced much.

Figure 11C:
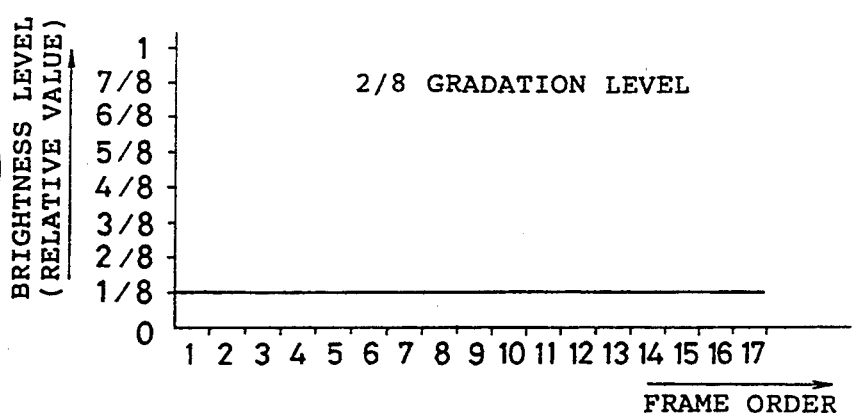

In the case of displaying the 2/8 gradation level, as shown in FIG. 11(c), since one pixel is always turned on throughout all frame time periods, the brightness level is always ⅛. Accordingly the average brightness level is also ⅛ during one integration time period consisting of 8 frame time periods. In this case, since the brightness level does not vary, no flicker occurs.

Figure 11D:
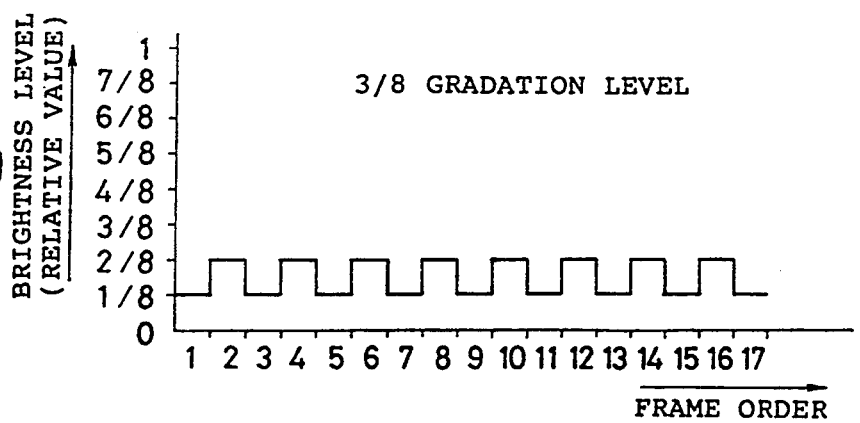

In the case of displaying the ⅜ gradation level, as shown in FIG. 11(d), since one pixel is turned on in the 1st frame the brightness level is ⅛ and since two pixels are turned on in the 2nd frame the brightness level becomes 2/8, and this cycle is repeated. As a result the 3/16 brightness level is displayed on the average during one integration time period consisting of 8 frame time periods. Further, since a frequency of alternating the ⅛ and 2/8 brightness levels is a half of the frame frequency and greater than the frequency having 8 frame periods as one integration period, flicker is reduced much.

Figure 11E:
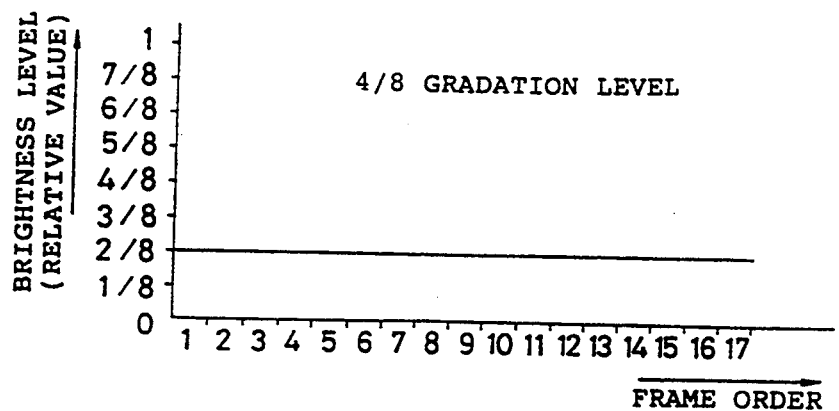

In the case of displaying the 4/8 gradation level, as shown in FIG. 11(e), since two pixels are always turned on throughout all frame time periods, the brightness level is always 2/8. Accordingly the average brightness level is also 2/8 during one integration time period consisting of 8 frame time periods. In this case also, since the brightness level does not vary, no flicker occurs.

Figure 11F:
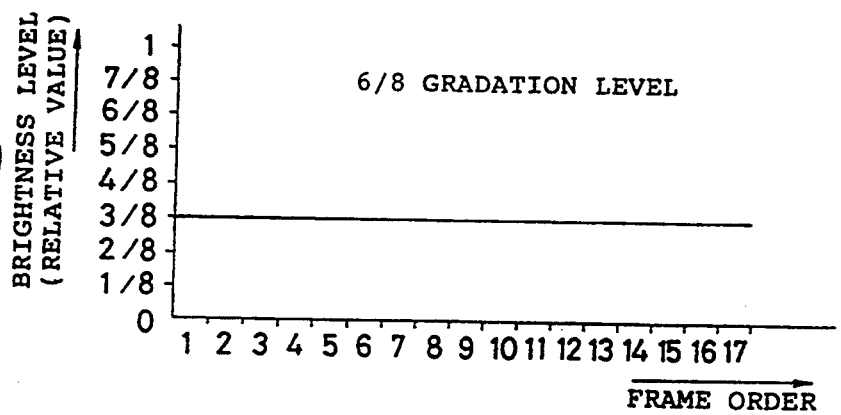

In the case of displaying the 6/8 gradation level, as shown in FIG. 11(f), since three pixels are always turned on throughout all frame time periods, the brightness level is always ⅜. In this case also, since the brightness level does not vary, no flicker occurs.

Figure 11G:
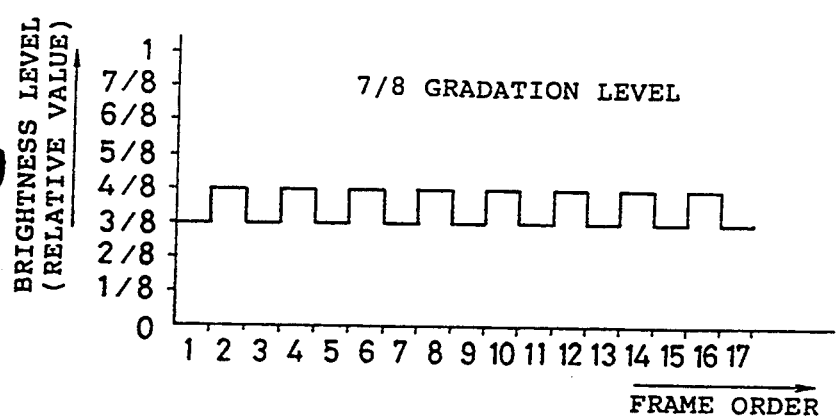

In the case of displaying the ⅞ gradation level, as shown in FIG. 11(g), since three pixels are turned on in the 1st frame the brightness level is ⅜ and since four pixels are turned on in the 2nd frame the brightness level becomes 4/8, and this cycle is repeated. As a result the 7/16 brightness level is displayed on the average during one integration time period consisting of 8 frame time periods. And since a frequency of alternating the ⅜ and 4/8 brightness levels is a half of the frame frequency and greater than the frequency having 8 frame periods as one integration period, flicker is reduced much.

Figure 11H:
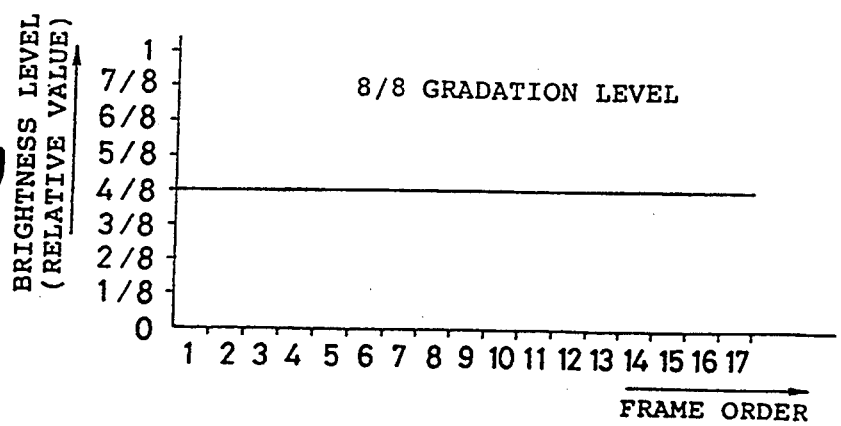

In the case of displaying the 8/8 gradation level, as shown in FIG. 11(h), since four pixels are always turned on throughout all frame time periods, the brightness level is always 4/8. Accordingly the average brightness level is also 4/8 during one integration time period consisting of 8 frame time periods. In this case also, since the brightness level does not vary, no flicker occurs.

By the way, in the case of displaying the checker pattern shown in FIG. 12 according to the gradation rules of the previously proposed example shown in Table 1, flicker is noticeable on the screen. This is described below taking the 6/8 gradation level of display as an example.

Figure 3:
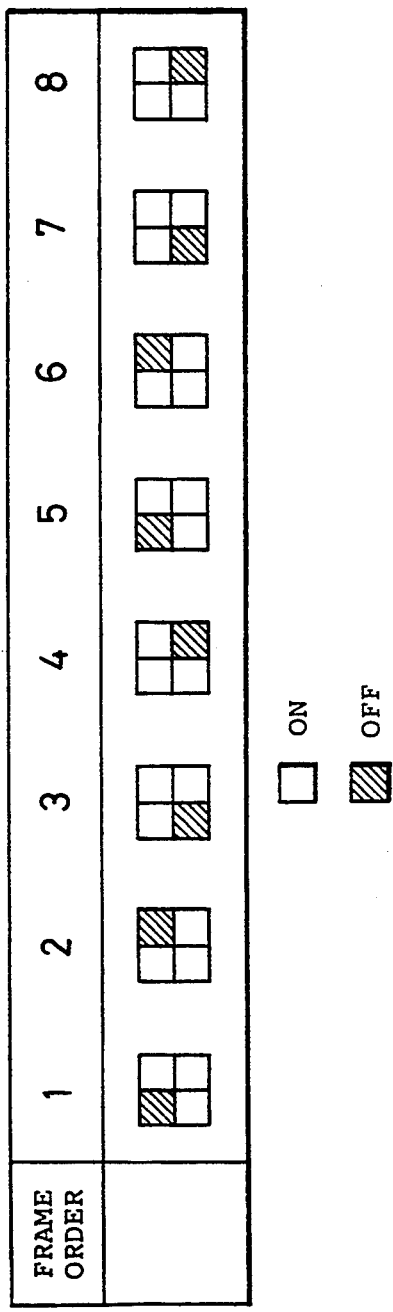
FIG. 3 is a schematic diagram showing a gradation rule for displaying the 6/8 gradation level in the driving method proposed as an example.
Figure 4:
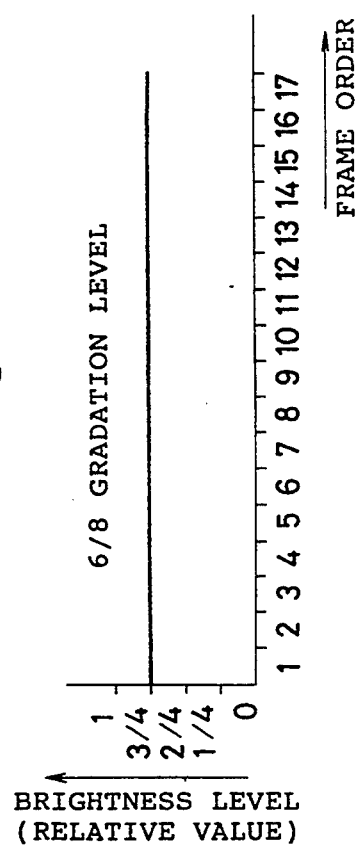
FIG. 4 is a schematic diagram showing variation of brightness in one group of pixels controlled on the basis of the gradation rule.

FIG. 3 is a schematic diagram showing the gradation rule for the 6/8 gradation level in Table 1. The gradation rule for displaying a checker pattern as shown in FIG. 12 is indicated by a schematic diagram shown in FIG. 13.

Namely, the schematic diagram shown in FIG. 13 is equivalent to the case of turning off the pixels B and C in all frames in the schematic diagram shown in FIG. 3. Accordingly, brightness as a whole of the unit image area of one group composed of the four pixels A to D is as shown in FIG. 14. In FIG. 14, the one pixel D is turned on in the first frame and the brightness level is ¼, the two pixels A and D are turned on in the second frame and the brightness level is 2/4, the two pixels A and D are turned on in the third frame also and the brightness level is 2/4, the one pixel A is turned on in the 4th frame and the brightness level is ¼, and the gradation rules in the first to fourth frames are repeatedly applied to the fifth to eighth frames. Namely, in the case of displaying a checker pattern according to the gradation rule for the 6/8 gradation level, the brightness level is 2/4 in consecutive two frames and is ¼ in the following consecutive two frames, and this cycle is repeated. Accordingly a frequency of alternating the ¼ and 2/4 brightness levels is one fourth of the frame frequency, and is less than the frequency in case of the same 6/8 brightness level in the above-mentioned embodiment. Namely, in the case that the frame frequency is 80 Hz or so, the frequency of alternating becomes 20 Hz or so, and as a result flicker comes out to be very noticeable and causes deterioration of quality of the display.

As compared with this, in the case of the embodiment, the frequency of alternating variation of brightness level is at least a half or so of the frame frequency, so flicker is not noticeable much, as mentioned above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A method for driving a multilevel gradation display device comprising the steps of:

grouping all pixels of the display device into a plurality of groups, each composed of a plurality of pixels;

grouping the plurality of pixels in each group into a plurality of subgroups, each composed of a plurality of pixels;

setting a plurality of frame time periods as one integration time period, during which a plurality of pixels in each group are selected to be in a first display state, thereby creating the display capable of multiple levels of gradation over a plurality of integration time periods; and selecting a plurality of pixels in each group to be in a first display state, the number of pixels selected being dependent upon gradation display level selected, for each of the frame time periods within each of a plurality of integration time periods, each of the pixels in each subgroup within each group being non-contiguous with each other and being selected to be in the same display state for each frame time period in each of the integration time periods for each of the plurality of gradation display levels in the multilevel gradation display.

2. The method of claim 1, wherein eight pixels, each contiguous to at least two other pixels in the group, compose each group.

3. The method of claim 2, wherein two pixels compose each subgroup.

4. The method of claim 1, wherein the first display state is an ON state.

5. The method of claim 1, wherein nonselected pixels in each group are in a second state, different from the first state.

6. The method of claim 1, wherein the second state is an OFF state.

7. The method of claim 1 wherein a number of levels of gradation possible in the multilevel gradation display is at least equal to the number of frame time periods in an integration time period.

8. The method of claim 1, wherein the number of pixels to be turned on in each frame time period varies from minimum to maximum, at most, every three frame time periods, to thereby reduce display flicker.

9. The method of claim 1, wherein the number of pixels to be turned on in each frame time period varies from minimum to maximum, at most, every other frame time period, to thereby reduce display flicker.

10. The method of claim 1, wherein the number of pixels turned on in each subgroup, for each integration time period, is equal.

11. A method for driving a multilevel gradation display device comprising the steps of:
grouping all pixels of the display device into a plurality of groups, each composed of a plurality of pixels;
grouping the plurality of pixels in each group into a plurality of subgroups, each composed of a plurality of pixels;
setting a plurality of frame time periods as one integration time period, during which a plurality of pixels in each group are selected to be in a first display state, thereby creating the display capable of multiple levels of gradation over a plurality of integration time periods; and
selecting a plurality of pixels in each group to be in a first display state, the number of pixels selected being dependent upon gradation display level selected, for each of the frame time periods within each of a plurality of integration time periods, the pixels in each subgroup within each group being selected to be in the same display state as the pixels in another subgroup for each frame time period in each of the integration time periods for each of the plurality of gradation display levels in the multilevel gradation display, the pixels in each subgroup being horizontally and vertically non-contiguous with each of the pixels in the corresponding another subgroup of the same display state.

12. The method of claim 11, wherein eight pixels, each contiguous to at least two other pixels in the group, compose each group.

13. The method of claim 12, wherein two pixels compose each subgroup.

14. The method of claim 13, wherein the two pixels in each subgroup are contiguous.

15. The method of claim 11, wherein the first display state is an ON state.

16. The method of claim 11, wherein nonselected pixels in each group are in a second state, different from the first state.

17. The method of claim 11, wherein the second state is an OFF state.

18. The method of claim 11 wherein a number of levels of gradation possible in the multilevel gradation display is at least equal to the number of frame time periods in an integration time period.

19. The method of claim 11, wherein the number of pixels to be turned on in each frame time period varies from minimum to maximum, at most, every three frame time periods, to thereby reduce display flicker.

20. The method of claim 11, wherein the number of pixels to be turned on in each frame time period varies from minimum to maximum, at most, every other frame time period, to thereby reduce display flicker.

21. The method of claim 11, wherein the pixels in each subgroup are controlled by driving a common horizontal row of the display device.

22. The method of claim 11, wherein the number of pixels turned on in each subgroup, for each integration time period, is equal.

* * * * *